3,284,405
STABILIZED POLYMER COMPOSITIONS CONTAINING DIPHENYL MONO- OR DI-CARBOXYLATES
Aubert Yaucher Coran, Charleston, W. Va., and Constantine Emmanuel Anagnostopoulos, St. Louis, Mo., assignors to Monsanto Company, a corporation of Delaware
No Drawing. Filed Dec. 23, 1963, Ser. No. 332,941
11 Claims. (Cl. 260—45.85)

The present invention relates to new and improved olefin polymer compositions. More particularly, this invention relates to compositions comprising an olefin or vinyl halide polymer in combination with an adjuvant which has the property of stabilizing the properties of the polymer against the degradative effects of ultraviolet light.

In accordance with this invention, it has been found that the properties of an olefin or vinyl halide polymer are improved by incorporating therein a stabilizing amount of a compound of the formula, (1)
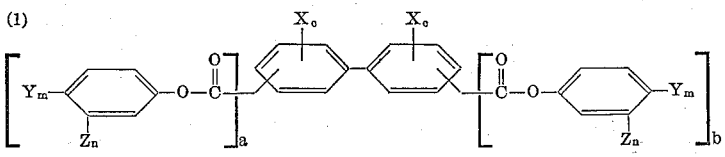

wherein: $a$ and $b$ are integers from zero to one, and the sum of $a+b$ is at least one;
$c$ is an integer from zero to two;
$m$ and $n$ are unlike integers from zero to one;
X is selected from the group consisting of alkyl and alkoxy of one to four carbon atoms;
Y is selected from the group consisting of α-cumyl and

where R, $R_1$ and $R_2$ are each alkyl of one to twenty-one carbon atoms, and the sum of the carbon atoms in R, $R_1$ and $R_2$ is up to twenty-three; and
Z is alkoxy of one to eighteen carbon atoms.

Illustrative examples of specific esters of the biphenylcarboxylic acids contemplated by the foregoing formula are:
4-t-butylphenyl p-phenylbenzoate,
4-t-butylphenyl o-phenylbenzoate,
4-(1,1-dimethylpropyl)phenyl p-phenylbenzoate,
3-methoxyphenyl o-phenylbenzoate,
3-propoxyphenyl m-phenylbenzoate,
4-α-cumylphenyl p-(4-methoxyphenyl)benzoate,
bis(p-t-butylphenyl)-2,2'-biphenyldicarboxylate,
bis(m-dodecyloxyphenyl)-3,3'-biphenyldicarboxylate,
bis[p-(1-ethyl-methylpentyl)phenyl]-4,4'-diphenyldicarboxylate,
bis[p-(1,1,3,3-tetramethylbutyl)phenyl]-4,4'-biphenyldicarboxylate,
bis(m-octadecylcycloxyphenyl)dehydrodiveratrate, and
bis(p-t-dodecylphenyl)-4,4'-biphenyldicarboxylate.

The biphenylcarboxylates of this invention can be prepared by reacting a halide of a biphenyl mono- or dicarboxylic acid with an appropriate substituted phenol such as para-alkylphenol or meta-alkoxyphenol. Exemplary preparations are fully described in copending application Serial No. 332,917, filed December 23, 1963.

The olefin polymers used in the compositions of this invention can be any normally solid short-chain mono-olefinic aliphatic hydrocarbon polymer, e.g., polymers of ethylene, propylene, isobutylene, etc., regardless of the process by which it is produced. For example, not only the commercial polyethylene currently produced by high-pressure processes, which is a low-density polymer, can be used, but also high-density ethylene polymers obtained from the newer low-pressure processes, such as the proprietary materials, "Marlex," "Marlex 50," etc., produced by the so-called Phillips process (Phillips Petroleum Company), the so-called Ziegler polymers produced by the Ziegler process, and other low-pressure processes wherein the so-called Ziegler-type catalysts are used.

The short-chain mono-olefinic aliphatic hydrocarbon polymers used in the compositions of this invention may be copolymers of two or more of the aforementioned short-chain mono-olefinic aliphatic hydrocarbon monomers, especially copolymers of ethylene with minor amounts (from 2 to 10 percent) of higher olefins such as propylene or butylene, and copolymers of one or more short-chain mono-olefinic aliphatic hydrocarbon monomers with minor proportions, not to exceed 15% by weight of the olefin, of other ethylenically-unsaturated comonomers such as styrene, vinyl chloride, vinyl acetate, vinyl methyl ether, vinylidene chlorofluoride, methyl methacrylate.

The olefin polymers to which the present invention is applicable must have molecular weights sufficiently high to be normally solid at room temperatures, i.e., above about 5,000; preferably, the olefin polymers will have even higher molecular weights, e.g. 20,000 and above. The molecular weights in question are those calculated in the conventional manner on the basis of the viscosity of the polymer in solution, as described in J.A.C.S. 73, page 1901 (1951).

The vinyl halide polymers used in the compositions comprise the product of polymerization of a mass containing a vinyl halide monomer, especially a predominant proportion of said monomer. Among such polymers are (1) the polyvinyl halides, such as, for example, polyvinyl chloride (including the different molecular weight forms, e.g., gamma-polyvinyl chloride, etc.), polyvinyl bromide, etc.; (2) vinyl resins produced by the conjoint polymerization of a vinyl halide, e.g., vinyl chloride, and a vinyl ester of a lower saturated aliphatic monocarboxylic acid, for instance, vinyl acetate (such vinyl chloride-vinyl acetate copolymers being available under the trade name of Vinylite resins wherein the vinyl chloride components is present in a preponderant amount), vinyl propionate, vinyl butyrate, vinyl hexoate, vinyl acetobutyrate, vinyl chloroacetate, vinyl chloropropionate, etc., it being understood from the foregoing examples that the term "lower saturated aliphatic monocarboxylic acid" embraces ones containing at most six carbon atoms; (3) vinyl resins produced by the conjoint polymerization of a vinyl halide and an acrylic compound, e.g., the copolymers of vinyl chloride with, for example, ethyl methacrylate, methyl methacrylate, benzyl or chlorobenzyl acrylate, methyl chloroacrylate, etc.; (4) copolymers of a vinyl halide, e.g., vinyl chloride, and a vinylidene halide, e.g., vinylidene chloride; and (5) many other vinyl resin copolymers, such as the copolymers of three-component systems, for example, vinyl chloride, vinyl acetate and ethyl methacrylate, etc. As will be understood by those skilled in the art, other multicomponent copolymers may be used, the only requirement being that at least one of the components is a vinyl halide.

Particularly from the standpoint of optimum stabilizing effectness, and also considering the availability of starting materials and commercial practicality, an especially preferred group of esters is characterized by the formula, (2)

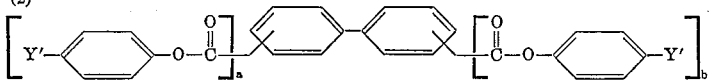

wherein:

$a$ and $b$ are integers from zero to one, and the sum of a $a+b$ is at least one; and Y' is alkyl of four to twenty-four carbon atoms, such alkyl being connected to the phenyl ring by a tertiary carbon atom.

Typical examples of specific esters with the preferred group of this formula are:

4-t-butylphenyl m-phenylbenzoate,
4-(1,1-dimethylbutyl)phenyl p-phenylbenzoate,
bis(p-t-butylphenyl)-4,4'-biphenyldicarboxylate,
bis[p-1,1,3,3-tetramethylbutyl)phenyl]-2,2'-biphenyldicarboxylate, Bis(p-t-nonylphenyl)-4,4-biphenyldicarboxylate, and those esters of biphenylcarboxylic acids herein the 4-alkylphenol starting material comes from the reaction product of a phenol and a branched chain propylene or butylene polymer. As should be apparent, the alkylphenols prepared from such polymers will be predominantly those wherein the alkyl group is attached to the nucleus through a tertiary carbon atom.

In evaluating the light stabilizing efficiency of the biphenylcarboxylates of this invention, use is made of the following empirical testing methods:

(1) *Carbonyl content.*—The carbonyl content of the composition is determined after exposure by measurement of the infraraed absorption in the 5.82 millimicron region and is expressed as mols×10⁴ per liter. Reference is made to the following two publications concerning the determination of carbonyl content by infrared measurements: Rugg, Smith and Bacon, J. Polymer Sci. 13, 535 (1954); Cross, Richards and Willis, Discussions Faraday Soc., No. 9,235 (1950).

(2) *Vinyl group formation.*—Infrared spectrographic measurements are made before and after exposure using the baseline technique in the region of 11.0 microns and the extinction coefficients of J. A. Anderson and W. D. Sugfried, Anal. Chem. 20, 998 (1948). The amount of vinyl (C=C) formed during exposure is expressed in mols×10⁴ per liter.

(3) *180° C. bend tests.*—Specimens were folded and the amount of cracking, crazing, etc., was recorded.

The following procedures, in which all parts and percentages are by weight unless otherwise specified, more fully illustrate the nature of the invention.

PROCEDURE 1

Test compositions are prepared by incorporating the additive into polyethylene (molecular weight 20,000) on a heated roll mill. Thereafter the polyethylene is compression molded into sheets about 6 mils thick. Film samples containing the various additives noted below, and control films containing no additives, are exposed to ultraviolet radiation, a major portion of which is due to the 3130 and 3657 A. mercury lines (G. E. H3FE lamp). The films are exposed at a distance of 5 inches from a light source having a total ultraviolet emission of about 10 watts for various periods of time. The results obtained for several biphenylcarboxylic acid esters of this invention are set forth in Table A, below. The additives employed are:

(A) 4-t-butylphenyl p-phenylbenzoate,
(B) 4-(1,1,3,3-tetramethylbutyl)phenyl p-phenylbenzoate,
(C) 3-octadecyloxyphenyl p-phenylbenzoate,
(D) bis(p-t-butylphenyl)-2,2'-biphenyldicarboxylate,
(E) bis[p - (1,1,3,3-tetramethylbutyl)phenyl] - 4,4'-biphenyldicarboxylate,
(F) bis(p - α - cumylphenyl) - 2,2'-biphenyldicarboxylate,
(G) bis(p - nonylphenyl) - 4,4' - biphenyldicarboxylate, and
(H) bis[p - 1,1,3,3 - tetramethylbutyl)phenyl] - 2,2'-biphenyldicarboxylate.

Table A

| Additive | Hours | Conc., Percent | Carbonyl | Vinyl | 180° Bend |
|---|---|---|---|---|---|
| None | 87 | | 196 | 137 | (*) |
| A | 87 | 1 | 171 | 0 | (*) |
| B | 87 | 1 | 80 | 0 | (*) |
| C | 87 | 1 | 117 | 27 | (*) |
| E | 87 | 1 | 71 | 0 | (*) |
| G | 87 | 1 | 70 | 0 | (*) |
| None | 95 | | 142 | 133 | (*) |
| D | 95 | 1 | 68 | 30 | (*) |
| F | 95 | 1 | (*) | 0 | (*) |
| None | 106 | | 140 | 75 | (*) |
| H | 106 | 1 | 70 | 0 | (*) |
| None** | 200 | | 504 | 493 | Very Poor. |
| A | 200 | 1 | 284 | 0 | Good. |
| B | 200 | 1 | 230 | 83 | Good. |
| C | 200 | 1 | 266 | 83 | Good. |
| E | 200 | 1 | 206 | 0 | Good. |
| G | 200 | 1 | 177 | 90 | Good. |
| None** | 200 | | 470 | 425 | Poor. |
| D | 200 | 1 | 230 | 60 | Good. |
| F | 200 | 1 | (*) | 50 | Fair. |
| None** | 200 | | 288 | 248 | Poor. |
| H | 200 | 1 | 209 | 0 | Good. |

*Not tested.
**Several controls were run at 200 hours. The results obtained are listed with those of the stabilized samples tested during the same time.

Results similar to those obtained with additives such as (A) and (H) are realized by substituting other and different biphenylcarboxylates within the scope of Formula 2. On the other hand, results similar to those obtained with additives such as (C) and (F) are realized by substituting other and different biphenylcarboxylates within the scope of Formula 1 but beyond the scope of Formula 2.

PROCEDURE 2

Polyethylene (average molecular weight ca. 20,000) films of varying thicknesses, containing amounts of Additives (B) and (E) of Procedure 1, such amounts varying from 0.2% to 3.0%, are prepared by dry blending each of the compounds in the amount desired, extruding the blends twice, and then blowing them into films. A control film containing no ester is prepared in the same manner. The films are exposed to direct sunlight in the State of Florida by mounting the films (unbacked at an angle of 45° from the horizontal) on racks facing the south. Samples of each film are removed periodically and tested for carbonyl content and vinyl group formation. The results obtained with films of 2-mil and 5-mil thicknesses, over periods of from about 1 to 5 months, demonstrate that the films containing the additives are significantly more resistant to degradation.

PROCEDURE 3

Ten grams of powdered polypropylene (viscosity molecular weight 220,000) are mixed with 0.4% of bislauryl thiodipropionate, 0.3% of 4,4'-butylidenebis-(6-tert.-butyl-m-cresol), and an ester of this invention. The specific esters are Additives (A) and (H) of Procedure 1. The mixture is worked on a roll mill at 165–170° C. for 2–3 minutes. Films are formed from pieces of the milled sheets (0.8" x 1.2" x 0.012") by heat and pressure (11.3 kg.) between two polished glass plates (treated with dimethyldichlorosilane vapor and washed clean with chloroform and acetone) using copper wire spacers of suitable thicknesses. The "sandwiches" are heated under pressure on a hot plate (220–230° C.) for about 5 minutes and 10 minutes for 8-mil and 4-mil films, respectively. After air-cooling to about room temperature, the films are removed from the plates. Control films containing no ester are prepared in the same manner.

The films are exposed to direct sunlight in the state of Florida by mounting the films (unbacked at an angle of 450° from the horizontal) on racks facing the south. Samples of each film are removed periodically and tested for carbonyl content. The results obtained further demonstrate that the biphenylcarboxylic acid esters of this invention serve to stabilize the films against the degradative effects of ultraviolet light.

PROCEDURE 4

In order to test vinyl halide polymer compositions, films are prepared from 100 parts of polyvinyl chloride, 50 parts of di(1-ethylhexyl)phthalate, 3 parts of epoxidized soya bean oil, and 3 parts of a liquid complex of Ba/Cd octylphenate, triphenyl phosphite, zinc 2-ethylhexoate and stearic acid. In addition, some of test films contained either 1 or 3 parts of 4-(1,1,3,3-tetramethylbutyl) phenyl p-phenylbenzoate. The ingredients are dry blended, milled at 175° C. for about 5 minutes, and then calendered to film thicknesses of 0.004, 0.010 and 0.020 inch.

The films are exposed in the manner described in Procedures 2 and 3. The films are checked at intervals to detect embrittlement and/or the appearance of stains. The control films containing no biphenylcarboxylate failed after 1200 hours of exposure. The films containing the ester of this invention were exposed for an additional 2800 hours, and even after this total of 4000 hours, no failure was detected in these films.

As is obvious from the above procedures, the biphenylcarboxylates contemplated herein are valuable stabilizers for polyolefinic and polyvinyl halide materials. The manner in which they are incorporated into or applied to the polymer materials will depend upon the indivdual nature of the polymer and upon its physical form; but it is generally that which is customarily employed when the same polymers in the same physical form are contacted with prior art adjuvants.

Variations or modifications of the compounds, and the quantities thereof employed in the above procedures, can be made to accommodate different requirements so long as the compound belongs to the general class of biphenylcarboxylic acid esters hereinbefore defined. The same process, as illustrated in the above procedures, will be found to be satisfactory for producing additional illustrations, e.g., by employing, in the place of the specific acid esters used in the procedures, other specific esters within the broad scope of the structural formula given at the outset of this disclsoure, or by employing olefin or vinyl halide polymers different from those used in the procedures.

The choice and the amount of the particular acid ester used to stabilize a polymer can vary considerably depending upon many factors. Such factors include the nature of the particular polymer, the thickness of the film or other article, and the conditions of service to be encountered. Thus, in the stabilization of a polyolefin or a polyvinyl halide to be used in the manufacture of goods which are normally subjected to the action of sunlight, as well as exposure to the elements, the use of relatively high concentrations of the stabilizers of this invention is advantageous. The same is true of films which are used in outdoor applications. On the other hand, when the article of manufacture is not to be subjected to particularly severe conditions, such as in the case of goods which are to be used indoors, relatively low concentrations can be successfully employed. Accordingly, the amount used is a stabilizing amount determinable by a consideration of these many factors. In general, concentrations of the biphenylcarboxylates of from about 0.001% to about 10% by weight of the polymer can be used. Preferably, from about 0.1% to 3% by weight of said esters, based on the weight of the polymer, is used in the compositions of this invention.

Most polymeric compositions comprise many ingredients, such as dyes, antistatic agents, fillers, pigments, plasticizers and heat stabilizers, and the compounds of this invention can be employed in conjunction with such other ingredients without any adverse effects. Likewise, the acid esters of this invention may be used in conjunction with other known light stabilizers. The ingredients can be intermixed by milling, blending, extruding or any of the other conventional methods which are well known to those skilled in the art.

The modified polymeric materials of this invention may be molded, extruded or sprayed. Typical applications for such materials include molded or extruded objects, continuous sheetings, tubing, fibers, films, wire coatings, textile coatings, laminates and adhesives.

Increased amounts of the biphenylcarboxylic acid esters (i.e., over and above the amount which is pre se compatible with the polymer) can be incorporated into the solid polymeric alkenes, such as polyethylene, polypropylene and polyisobutylene, by using up to 10% by weight of the polymer of finely divided silica. In general, the amount of silica used is from one to two times the amount of the ester stabilizer which is to be incorporated in the polymer. Preferably the silica and the ester are mixed separately prior to incorporation into the polymer.

While this invention has been described with respect to certain embodiments, it is not so limited, and it is to be understood that variations and modifications thereof may be made without departing from the spirit or scope of this invention.

The embodiments of the invention in which an exclusive property or privilege is claimed are defined as follows:

1. A composition comprising a major amount of a material selected from the group consisting of vinyl halide polymers and normally solid polymers of a mono-olefinic aliphatic hydrocarbon monomer having from 2 to 4 carbon atoms, and a stabilizing amount of a compound of the formula,

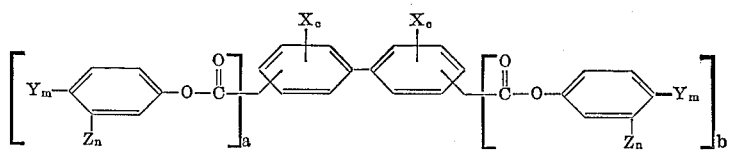

wherein:
 $a$ and $b$ are integers from zero to one, and the sum of $a+b$ is at least one;
 $c$ is an integer from zero to two;
 $m$ and $n$ are unlike integers from zero to one;
 X is selected from the group consisting of alkyl and alkoxy of one to four carbon atoms;
 Y is selected from the group consisting of α-cumyl and

wherein R, $R_1$ and $R_2$ are each alkyl of one to twenty-one carbon atoms, and the sum of the carbon atoms in R, $R_1$ and $R_2$ is up to twenty-three; and
 Z is alkoxy of one to eighteen carbon atoms.

2. The composition defined in claim 1 further characterized in that the material is polyethylene.

3. The composition defined in claim 1 further characterized in that the material is polypropylene.

4. The composition defined in claim 1 further characterized in that said stabilizing amount of said compound is from about 0.1% to about 3.0% by weight of the material.

5. A composition comprising a major amount of a normally solid polymer of a mono-olefinic aliphatic hydrocarbon monomer having from 2 to 4 carbon atoms, and a stabilizing amount at least about 0.001% by weight of the polymer, of a compound of the formula,

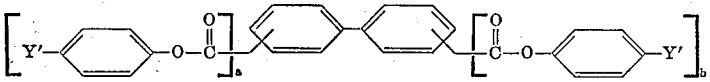

wherein:
  $a$ and $b$ are integers from zero to one, and the sum of $a+b$ is at least one; and
  Y' is alkyl of four to twenty-four carbon atoms, such alkyl being connected to the phenyl ring by a tertiary carbon atom.

6. The composition defined in claim 5 further characterized in that the polymer is polyethylene.

7. A composition as defined in claim 6 further characterized in that the compound is 4-t-butylphenyl p-phenylbenzoate.

8. A composition as defined in claim 6 further characterized in that the compound is bis[p-(1,1,3,3-tetramethylbutyl)phenyl]-2,2'-biphenyldicarboxylate.

9. A composition as defined in claim 6 further characterized in that the compound is bis[p-1,1,3,3-tetramethylbutyl)phenyl]-2,2'-bisphenyldicarboxylate.

10. A composition as defined in claim 6 further characterized in that the compound is bis(p-t-butylphenyl)-2,2'-biphenyldicarboxylate.

11. The composition defined in claim 6 further characterized in that the polymer is polyethylene.

References Cited by the Examiner
UNITED STATES PATENTS 2,464,250  3/1949  Moll et al. _____ 260—45.85
2,980,648  4/1961  Bell et al. _____ 260—45.85

LEON J. BERCOVITZ, *Primary Examiner.*

G. W. RAUCHFUSS, *Assistant Examiner.*

UNITED STATES PATENT OFFICE
CERTIFICATE OF CORRECTION

Patent No. 3,284,405　　　　　　　　　　　　　　November 8, 1966

Aubert Yaucher Coran et al.

It is hereby certified that error appears in the above numbered patent requiring correction and that the said Letters Patent should read as corrected below.

Column 8, line 5, for "2,2'" read -- 4,4' --; line 7, for "p-1" read -- p-(1 --; line 8, for "bisphenyldicarboxylate" read -- biphenyldicarboxylate --.

Signed and sealed this 5th day of September 1967.

(SEAL)
Attest:

ERNEST W. SWIDER　　　　　　　　　　　　　　EDWARD J. BRENNER
Attesting Officer　　　　　　　　　　　　　　　Commissioner of Patents